US006327390B1

(12) United States Patent
Sun et al.

(10) Patent No.: US 6,327,390 B1
(45) Date of Patent: Dec. 4, 2001

(54) METHODS OF SCENE FADE DETECTION FOR INDEXING OF VIDEO SEQUENCES

(75) Inventors: Huifang Sun, Cranbury; Ajay Divakaran, Scotch Plains; Hiroshi Ito, Fort Lee; Tommy C. Poon, Murray Hill, all of NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/231,699

(22) Filed: Jan. 14, 1999

(51) Int. Cl.[7] .............................. G06K 9/46; H04B 1/66; G06F 3/00
(52) U.S. Cl. ................... 382/235; 382/236; 375/240.25; 345/328
(58) Field of Search ..................................... 382/236, 235, 382/232, 239; 348/700, 699; 375/240.25, 240.26; 345/328, 327, 326

(56) References Cited

U.S. PATENT DOCUMENTS

| 5,485,611 | * | 1/1996 | Astle ..................................... 382/236 |
| 5,493,345 | * | 2/1996 | Ishikawa et al. .................... 348/700 |
| 5,614,945 | * | 3/1997 | Sekine et al. ....................... 348/699 |
| 5,619,595 | * | 4/1997 | Naito .................................. 382/236 |
| 5,911,008 | * | 6/1999 | Niikura et al. ...................... 382/236 |
| 6,023,520 | * | 2/2000 | Nagasaka et al. .................. 382/236 |

FOREIGN PATENT DOCUMENTS

| 0 810 793 | 10/1995 | (EP) | ................................. H04N/7/50 |
| 0 675 495 | 12/1997 | (EP) | ............................. G11B/27/028 |

OTHER PUBLICATIONS

Feng, et al.; "Scene Change Detection Algorithm for MPEG Video Sequence". Proceedings of the 1996 IEEE International Conference on Image Processing. Part 2 (of 3); Switzerland, Sep., 1996. pp. 821–824.

Yeo, et al.; "Rapid Scene Analysis on Compressed Video"; IEEE Transactions on Circuits and Systems for Video Technology. vol. 5, No. 6. New York, Dec. 1995. pp. 533–544.

Yeo, et al.; "A Unified Approach to Temporal Segmentation of Motion JPEG and MPEG Compressed Video"; Proceedings of the International Conference on Multimedia Computing and Systems. May, 1995. pp. 81–88.

Won, et al.; "Extracting Image Features from MPEG–2 Compressed Stream"; Proceedings from the SPIE. Jan., 1998. pp. 426–435.

* cited by examiner

Primary Examiner—Wenpeng Chen
(74) Attorney, Agent, or Firm—Dirk Brinkman

(57) ABSTRACT

A method locates scene changes in a sequence of images or frames that have been compressed without first decompressing the sequence. The sequence includes subsequences of P-frames between I-frames. DC residual coefficients including sign information are extracted from the sub-sequences of P-frames. If the number of residual coefficients in the P-frames exceed a predetermined threshold, then a scene change is indicated. Positive coefficients indicate fade-ins, and negative coefficients indicate fade-outs.

6 Claims, 1 Drawing Sheet

METHODS OF SCENE FADE DETECTION FOR INDEXING OF VIDEO SEQUENCES

BACKGROUND OF THE INVENTION

1. Field of the Invention

This invention relates to methods of scene fade detection for indexing of video signal sequences of the types encountered in, for example, High Definition Television (HDTV) broadcast signals and other video distribution systems such as are encountered on world wide web video services.

2. Description of the Prior Art

Basic methods for compressing the bandwidth of digital color video signals have been adopted by the Motion Picture Experts Group (MPEG).

The MPEG standards achieve high data compression rates by developing information for a full frame of the image only every so often. The full image frames, or intra-coded pictures are called "I-frames", and contain full frame information independent of any other frames. B-frames and P-frames are encoded between the I-frames and store only image differences with respect to the reference anchor frames.

Typically, each frame of a video sequence is partitioned into smaller blocks of pixel data and each block is subjected to a discrete cosine transformation (DCT) function to convert the statistically dependent spatial domain picture elements (pixels) into independent frequency domain DCT coefficients.

Respective 8×8 blocks of pixels are subjected to the Discrete Cosine Transform (DCT) to provide the coded signal. The resulting coefficients typically are subjected to adaptive quantization, and then are run-length and variable-length encoded. Thus, the blocks of transmitted data typically include fewer than an 8×8 matrix of codewords. Macroblocks of intraframe encoded data (I-frames) will also include information such as the level of quantization employed, a macroblock address or location indicator, and a macroblock type, the latter information being referred to as "header" or "overhead" information.

The blocks of data encoded according to P or B interframe coding also consist of matrices of Discrete Cosine Coefficients. In this instance, however, the coefficients represent residues or differences between a predicted 8×8 pixel matrix and the actual 8×8 pixel matrix. These coefficients also are subjected to quantization and run- and variable-length coding. In the frame sequence, I and P frames are designated anchor frames. Each P frame is predicted from the lastmost occurring anchor frame. Each B frame is predicted from one or both of the anchor frames between which it is disposed. The predictive coding process involves generating displacement vectors, which indicate which block of an anchor frame most closely matches the block of the predicted frame currently being coded. The pixel data of the matched block in the anchor frame is subtracted, on a pixel-by-pixel basis, from the block of the frame being encoded, to develop the residues. The transformed residues and the vectors comprise the coded data for the predictive frames. As with intraframe coded frames, the macroblocks include quantization, address and type information.

The results are usually energy concentrated so that only a few of the coefficients in a block contain the main part of the picture information. The coefficients are quantized in a known manner to effectively limit the dynamic range of ones of the coefficients and the results are then run-length and variable-length encoded for application to a transmission medium.

The so-called MPEG-4 format is described in "MPEG-4 Video Verification Model version 5.0", distributed by the Adhoc Group on MPEG-4 Video VM Editing to its members under the designation ISO/IEC JTC1/SC29/WG11 MPEG 96/N1469, November 1996. The MPEG-4 video coding format produces a variable bit rate stream at the encoder from frame to frame (as was the case with prior schemes). Since the variable bit rate stream is transmitted over a fixed rate channel, a channel buffer is employed to smooth out the bit stream. In order to prevent the buffer from overflowing or underflowing, rate control of the encoding process is employed.

With the advent of new digital video services, such as video distributed on the world wide web, there is an increasing need for signal processing techniques for identifying scene changes and other characteristics in the video sequences. Identification of scene changes, whether they are abrupt or gradual, are useful for the purposes of indexing, which, for example, facilitates rapid and simple image retrieval and scene analysis.

In the future, it should be expected that a significant amount of digital video material will be provided in the form of compressed or coded data as described above. operating on the video sequence information in its compressed form, rather than its decompressed or decoded form, where possible, usually permits more rapid processing because of the reduction in data size and the avoidance of transformation. It is advantageous to develop methods and techniques which permit operating directly on compressed data, rather than having to perform full frame decompression before other processing is performed.

It is known that when a block (macroblock) contains an edge boundary of an object, the energy in that block after transformation, as represented by the DCT coefficients, includes a relatively large DC coefficient (top left corner of matrix) and randomly distributed AC coefficients throughout the matrix. A non-edge block, on the other hand, usually is characterized by a similar large DC coefficient (top left corner) and a few (e.g. two) adjacent AC coefficients which are substantially larger than other coefficients associated with that block. This information relates to image changes in the spatial domain and, when combined with image difference information obtained from comparing successive frames (i.e. temporal differences) factors are available for distinguishing one video object (VO) from another. If only the DC values of macroblocks are used, an image that results will be a blurred version of the original image which retains much of the content of the original.

Previous work in indexing from compressed video had mostly emphasized DC coefficient extraction. In a paper entitled "Rapid Scene Analysis on Compressed Video", IEEE Transactions on Circuits and Systems for Video Technology, Vol. 5, No. 6, December 1995, page 533–544, Yeo and Liu describe an approach to scene change detection in the MPEG-2 compressed video domain, as well as review earlier efforts at detecting scene changes based on sequences of entire (uncompressed) image data, and various compressed video processing techniques of others. Yeo and Liu introduced the use of spatially reduced versions of the original images, so-called DC images, and DC sequences extracted from compressed video to facilitate scene analysis operations. Their DC image is made up of pixels which are the average value of the pixels in a block of the original image and the DC sequence is the combination of the resulting reduced number of pixels of the DC image.

Won et al, in a paper published in Proc. SPIE Conf. on Storage and Retrieval for Image and Video Databases, January 1998, describe a method to extract features from compressed MPEG-2 video by making use of the bits expended on the DC coefficients to locate edges in the frames. However, their work is limited to I-frames only. Kobla et al describe a method in the same Proceedings using the DC image extraction of Yeo et al to form video trails that characterize the video clips. Feng et al (IEEE International Conference on Image Processing, Vol. II, pp. 821–824, Sep. 16–19, 1996), use the bit allocation across the macroblocks of MPEG-2 frames to detect abrupt scene changes, without extracting DC images. Feng et al's technique is computationally the simplest since it does not require significant computation in addition to that required for parsing the compressed bitstream.

In accordance with a related invention made by the current inventors, which is described in an application entitled "METHODS OF SCENE CHANGE DETECTION AND FADE DETECTION FOR INDEXING OF VIDEO SEQUENCES", filed concurrently herewith, computationally simple methods have been devised which employ combinations of certain aspects of Feng et al's approach and Yeo et al's approach to give accurate and simple abrupt scene change detection. The present inventors also have investigated techniques that make use of bit allocation information to extract features of the video sequence.

Previous work of others in gradual scene change detection has employed various techniques such as considering the edge change fractions, a twin comparison approach, block matching based motion compensation-estimation, the detection of plateaus in a delayed frame difference metric, and a video edit model based approach. Of these, only the approach of detecting plateaus operates in the compressed domain.

It should be noted that the DC image extraction based technique is good for I-frames since the extraction of the DC values from I-frames is relatively simple. However, for P-frames, additional computation typically is needed.

As is described in the concurrently filed application, the present inventors determined, once a suspected scene/object change has been accurately located in a group of consecutive frames/objects by use of a DC image extraction based technique, application of an appropriate bit allocation-based technique, and/or an appropriate DC residual coefficient processing technique to P-frame information in the vicinity of the suspected change information quickly and accurately locates the cut point. This combined method is applicable to either MPEG-2 sequences or MPEG-4 multiple object sequences.

BRIEF SUMMARY OF THE INVENTION

In accordance with the present invention, a simplified method of processing digital image-representative video data in compressed form comprises extracting from a sequence of such digital video data, which includes at least I-frames and P-frames occurring between I-frame, sub-sequences of P-frames corresponding to groups of pictures, and processing the video data for each frame in each sub-sequence to extract corresponding DC residual coefficients, from which gradual fade-in and fade-out scene changes can be detected. Specifically, the occurrence of gradual scene changes is detected by determining the number of positive and negative DC residuals coefficients in each of the P-frames in excess of a threshold value to locate fade-in and fade-outs respectively.

The step of determining numbers of positive and negative DC residual coefficients to locate fade-in and fade-out scene changes comprises, in one embodiment, identifying each group of pictures in which DC components of one sign exceed the number of DC components of the opposite sign by at least a predetermined value.

Further, in another embodiment, the step of determining numbers of positive and negative DC residual coefficients to locate fade-in and fade-out scene changes includes the following sub-steps: counting the number of blocks having positive DC components and the number of blocks having negative DC components in each P-frame; determining which count is greater and saving the sign of the greater count for each P-frame; identifying each P-frame where the greater count is equal to or more than a predetermined majority of non-zero DC components in that P-frame; identifying each group of pictures in which DC components of one sign consistently exceed those of the opposite sign; designating a fade-in scene change where the greater count in each identified group of pictures is associated with a positive sign; and designating a fade-out scene change where such greater count is associated with a negative sign.

In one embodiment, the threshold for identifying P-frames where the count of blocks having positive or negative DC components is equal to, or exceeds a predetermined majority, is 60% of the non-zero DC components in that P-frame.

In one embodiment of the invention, the identification of a group of pictures in which DC components of one sign exceed those of the opposite sign in all P-frames takes place over a time interval substantially equal to a customary fade sequence employed in current video practice. In another embodiment, the time interval used as the basis for identifying fade scene changes is on the order of one second.

In this manner, temporal segmentation markers may be generated and are associated with the input video sequence to locate and identify the particular scene fade changes of the video sequence.

DETAILED DESCRIPTION OF THE INVENTION

Figure 1:
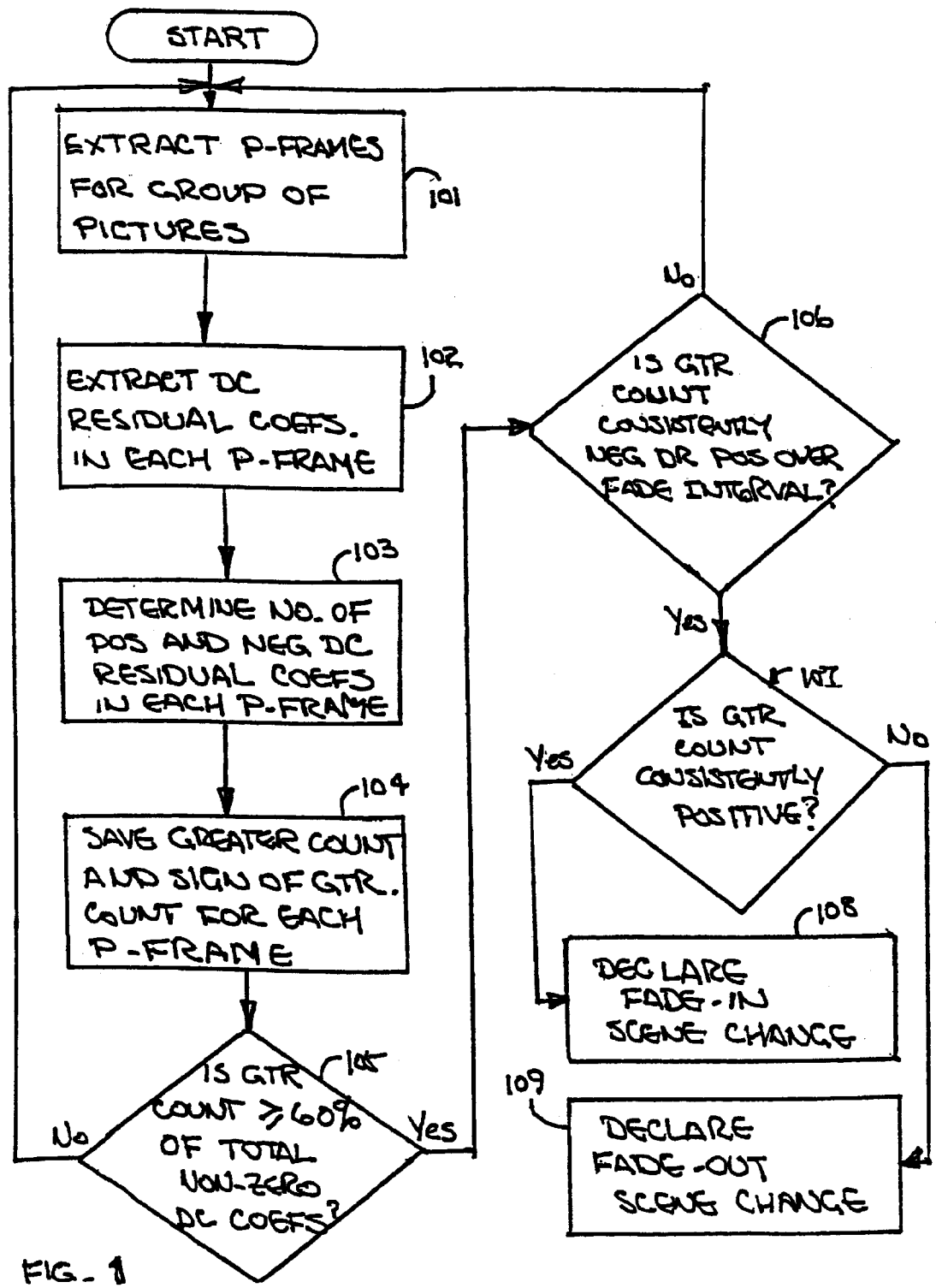
FIG. 1 shows in flow chart form the method of the present invention.

A specific preferred arrangement for the fade-in/fade-out scene change detection steps will now be described in detail. It should be appreciated that there is substantial opportunity for varying details of these steps without departing from the more general aspects of the present invention. Detailed method steps are, however, indicated below to provide an appreciation for the possible variations to persons skilled in this art.

Fade Detection Using Changes in Bits Taken to Encode DC Components of Residuals

It has been observed that, when there is a gradual scene change, every block of the image includes a DC correction term, since the image is fading in from a completely black frame or fading out to a completely black frame. With this in mind, it has been found that bit allocation profiles for DC components of residual blocks provide an indicator for fade detection. In accordance with the present invention, a method of fade detection comprises the following steps.

1. For each P-frame, count the number of blocks with negative DC components as well as the number of blocks with positive DC components. For the MPEG-2 as well as the MPEG-4 case, this step readily may be accomplished from the VLC parsing, since every non-zero DC component will be allocated a non-zero number of bits and a sign bit that indicates whether the component is positive or negative. Zero DC components are indicated by the run-length information and thus can be readily skipped.

2. Determine the characteristic of the two numbers obtained above versus the frame number.

3. Declare a fade-out if the number of negative transitions in a sequence of P-frames extending over a customary fade interval as employed in current video practice (e.g. of the order of approximately one second) is consistently equal to or greater than 60% of the total number of non-zero transitions. Conversely, declare a fade-in if the number of positive transitions meets the aforementioned threshold. It has been observed that a fade interval corresponds to approximately fifteen to forty-five frames and, more typically, about twenty-five or thirty frames under current broadcast techniques (about one second).

The inventive method can also be described as follows with reference to FIG. 1. At step 101, each subsequence of P-frames corresponding to a group of pictures is extracted from a sequence of digital image representative video data in compressed form, which comprises at least I-frames and P-frames occurring between the I-frames.

At step 102, the video data is processed in compressed form for each frame in the sub-sequence to extract corresponding DC residual coefficients, including sign information, for each of the P-frames. For the MPEG-2 as well as the MPEG-4 case, this step readily may be accomplished from the VLC parsing, since every non-zero DC component will be allocated a non-zero number of bits and a sign bit that indicates whether the component is positive or negative. Zero DC components are indicated by the run-length information and thus can be readily skipped.

At step 103, the numbers of positive and negative DC residual coefficients in each of the P-frames is determined. Specifically, for each P-frame the number of blocks with negative DC components and the number of blocks with positive DC components are counted, and for each P-frame the count that is greater is determined and saved along with the sign of the greater count, as in step 104.

At step 105, each P-frame where the greater count is equal to or greater than 60 percent of the total number of non-zero DC components is identified.

At step 106, each group of pictures in which DC components of a particular sign consistently exceed those of the opposite sign over a customary fade interval as employed in current video practice (e.g., on the order of one second) is identified. It has been observed that a fade interval corresponds to approximately fifteen to forty-five frames and more typically, about twenty-five or thirty frames under current broadcast techniques (about one second).

A fade-out scene change is declared where the greater count in an identified group of pictures is associated with a negative sign, as in steps 107 and 109.

A fade-in scene change is declared where the greater count is an identified group of pictures is associated with a positive sign, as in steps 107 and 108.

This fade detection technique capitalizes on the motion search carried out by the encoder. It measures the rate spent on encoding the DC difference between a particular macroblock and its closest match in the previous frame.

Thus, in accordance with the present invention, fade-in and fade-out scene changes may be detected, although in somewhat of a slightly more time-consuming and less precise manner than in the case of the copending application, by comparing the numbers of positive and negative DC components for all P-frames, with or without first inspecting I-frames in the manner disclosed in the co-pending application. Specifically, for each P-frame, the number of blocks with negative DC components as well as the number of blocks with positive DC components are counted. Declare a fade-out if the number of negative transitions is greater than or equal to 60% of the total number of non-zero transitions over a sequence of frames corresponding to at least a major portion of a customary fade interval. Conversely, declare a fade-in if the number of positive transitions meets the threshold level over a similar appropriate number of frames. Once again, a sliding window may be employed.

While the invention has been described in terms of a preferred embodiment, various modifications may be employed without departing from the scope of the invention, which is set forth in the following claims.

What is claimed is:

1. A method of processing digital image-representative video data in compressed form comprising the steps of:

extracting, from a sequence of digital image-representative video data in compressed form, which comprises at least I-frames and P-frames occurring between the I-frames, each sub-sequence of P-frames corresponding to a group of pictures, processing said video data in compressed form for each frame in said sub-sequence to extract corresponding DC residual coefficients, including sign information, for each of said Pframes, and determining numbers of positive and negative DC residual coefficients in said extracted P-frames in excess of a threshold value to locate fade-in and fade-out scene changes, respectively.

2. A method of processing digital image-representative video data in compressed form according to claim 1 wherein:

said step of determining comprises counting the number of blocks having positive DC components and the number of blocks having negative DC components in each said P-frame, determining which count is greater and saving the sign of the greater for each said P-frame, identifying each P-frame where the greater count is equal to or more than a predetermined majority of non-zero DC components in said P-frame, identifying each group of pictures in which DC components of a particular sign consistently exceed those of opposite sign, designating a fade-in scene change where said greater count in each said identified group of pictures is associated with a positive sign, and designating a fade-out scene change where said greater count in each said identified group of pictures is associated with a negative sign.

3. A method of processing digital image-representative video data in compressed form according to claim 2 wherein:

said step of identifying each P-frame further comprises identifying each P-frame where the greater count is equal to or more than 60 percent of the non-zero DC components in said frame.

4. The method of claim 2 wherein:

said step of identifying each group of pictures comprises identifying each such group of pictures in which DC components of one sign exceed those of opposite sign in all P-frames corresponding to a time interval substantially equal to a fade sequence.

5. The method of claim 3 wherein:

said step of identifying each group of pictures comprises identifying each such group of pictures in which DC components of one sign exceed those of opposite sign in all P-frames during a time interval of the order of one second.

6. The method of claim 1 wherein:

said step of determining numbers of positive and negative DC residual coefficients in said extracted P-frames in excess of a threshold value comprises identifying each group of pictures in which DC components of one sign exceed the number of DC components of the opposite sign by at least a predetermined value.

* * * * *